US010710823B2

(12) United States Patent
Berg et al.

(10) Patent No.: US 10,710,823 B2
(45) Date of Patent: Jul. 14, 2020

(54) PIVOTING LOAD CHUTE

(71) Applicant: Santa Rosa Systems, LLC, Mount Washington, KY (US)

(72) Inventors: Nicholas A. Berg, Louisville, KY (US); Paul Receveur, New Albany, IN (US)

(73) Assignee: Santa Rosa Systems, LLC, Mt. Washington, KY (US)

( * ) Notice: Subject to any disclaimer, the term of this patent is extended or adjusted under 35 U.S.C. 154(b) by 0 days.

(21) Appl. No.: 16/556,406

(22) Filed: Aug. 30, 2019

(65) Prior Publication Data
US 2020/0071097 A1    Mar. 5, 2020

Related U.S. Application Data

(60) Provisional application No. 62/725,465, filed on Aug. 31, 2018.

(51) Int. Cl.
*B65G 1/08*    (2006.01)
*B65G 67/06*    (2006.01)

(52) U.S. Cl.
CPC ................ *B65G 67/06* (2013.01)

(58) Field of Classification Search
None
See application file for complete search history.

(56) References Cited

U.S. PATENT DOCUMENTS

| 4,613,276 | A | 9/1986 | Blatchford |
| 6,041,907 | A * | 3/2000 | Bonnette ............... B28C 5/4251 |
| | | | 193/10 |
| 8,376,132 | B2 * | 2/2013 | Scapaccino ........ B29D 30/0016 |
| | | | 198/861.3 |
| 2016/0040489 | A1 | 2/2016 | Behrens |

FOREIGN PATENT DOCUMENTS

CN    204249090 U    4/2015
KR    10-0187391 B1    4/1999

OTHER PUBLICATIONS

Korean Intellectual Property Office, International Search Report and Written Opinion issued in corresponding Application No. PCT/US2019/048973, dated Dec. 12, 2019.

* cited by examiner

*Primary Examiner* — Kavel Singh
(74) *Attorney, Agent, or Firm* — Stites & Harbison, PLLC; David W. Nagle, Jr.; Gary N. Stewart

(57) ABSTRACT

A pivoting load chute includes one or more sections that define a conveying surface that is configured for rotation relative to a support stand about a substantially horizontal axis between a lowered position and a raised position. The pivoting load chute further includes at least one linkage assembly having (i) a first linkage arm, with a first end of the first linkage arm operably connected to the support stand, (ii) an actuator that is operably connected to and extends between the support stand and the first linkage arm, and (iii) a second linkage arm, with a first end of the second linkage arm operably connected to the one or more sections that define the conveying surface, and with a second end of the second linkage arm operably connected to a second end of the first linkage arm.

16 Claims, 9 Drawing Sheets

PIVOTING LOAD CHUTE

CROSS-REFERENCE TO RELATED APPLICATIONS

The present application claims priority to U.S. Patent Application Ser. No. 62/725,465 filed on Aug. 31, 2018, the entire disclosure of which is incorporated herein by reference.

BACKGROUND OF THE INVENTION

The present invention relates to the handling of parcels within a sorting or similar facility.

In a sorting facility for parcels, parcels are unloaded from trucks or other vehicles at unloading locations, sorted, and then loaded onto trucks or other vehicles at loading locations for delivery to the intended recipients. Thus, within the sorting facility, there is often a complex system of conveyors and equipment that facilitates transport and sorting of the parcels within the facility.

In such systems, a load chute is commonly used to feed parcels onto another conveyor. In order to properly feed the parcels, it is preferred that the load chute be adjustable, i.e., that the position of the distal end of the load chute can be adjusted. For instance, the distal end of the load chute may be raised or lowered relative to an underlying floor surface. Such a load chute is typically configured for rotation about an axis, and thus characterized as a "pivoting load chute."

There remains a need for an improved pivoting load chute construction for certain applications and uses within a sorting or similar facility.

SUMMARY OF THE INVENTION

The present invention is a pivoting load chute used to convey parcels.

An exemplary pivoting load chute made in accordance with the present invention has one or more sections that collectively define a conveying surface that extends from a first (or proximal) end to a second (or distal end) of the pivoting load chute. The pivoting load chute rotates about a substantially horizontal axis defined by a pin connection between the first section of the pivoting load chute and a support stand. Furthermore, the pivoting load chute includes at least one linkage assembly comprised of: a hydraulic cylinder with a barrel and a rod (or similar mechanical or electromechanical actuator); a first linkage arm; and a second linkage arm. The second linkage arm has a "dogleg" shape characterized by a lower section separated from an upper section by a bend, the importance of which will be described below.

The barrel of the hydraulic cylinder is connected to a lower portion of the support stand by a pin connection, such that the hydraulic cylinder can rotate about a substantially horizontal axis defined by the pin connection. A first (or proximal) end of the first linkage arm is connected to an intermediate portion of the support stand by a pin connection, such that the first linkage arm can rotate about a substantially horizontal axis defined by the pin connection. A distal end of the rod of the hydraulic cylinder is then connected to an intermediate portion of the first linkage arm by a pin connection.

A first (or proximal) end of the second linkage arm is connected to a bottom portion of the first section of the pivoting load chute by a pin connection, such that the second linkage arm can rotate about a substantially horizontal axis defined by the pin connection. A second (or distal) end of the second linkage arm is then connected to a second (or distal) end of the first linkage arm by a pin connection.

To transition the pivoting load chute from the lowered position to the raised position, the rod (or rods) of the hydraulic cylinder (or cylinders) is extended. Such extension of the rod applies a force to the first linkage arm and causes it to rotate about the substantially horizontal axis defined by the pin connection. At the same time, the second linkage arm begins to rotate relative to the first linkage arm about the substantially horizontal axis defined by the pin connection, and the second linkage arm applies a force to the bottom portion of the first section of the pivoting load chute. This causes the pivoting load chute to rise and move toward the raised position, as it rotates about the substantially horizontal axis defined by the pin connection between the first section of the pivoting load chute and the support stand.

When the pivoting load chute has been transitioned to the raised position, the linkage assembly has moved "over center," and the linkage assembly is now effectively locked into position. As shown, the upper section of the second linkage arm is oriented in a substantially parallel relationship with and provides an engagement surface contacting the bottom portion of the first section of the pivoting load chute. In this regard, the "dogleg" shape of the second linkage arm reduces the distance that the second linkage arm travels after passing "over center." If the second linkage arm was substantially straight, the pivoting load chute would abruptly drop after passing "over center." Furthermore, in the raised position, it is contemplated and preferred that the full weight of the first and second sections of the pivoting load chute is borne by the linkage assembly (or assemblies), and the weight is no longer supported by the hydraulic cylinder (or cylinders).

In order to return the pivoting load chute from the raised position to a lowered position, the rod (or rods) of the hydraulic cylinder (or cylinders) is retracted.

In some embodiments, the pivoting load chute includes identical left and right linkage assemblies, one on each side of the support stand. However, a single hydraulic power unit is preferably used to operate both hydraulic cylinders. A flow divider/combiner is thus interposed between the hydraulic power unit and the hydraulic cylinders to ensure the hydraulic cylinders are extended and retracted evenly. Without even flow and synchronized extension (or retraction) of the hydraulic cylinders, very slight manufacturing tolerances and/or slightly un-level conditions could cause the pivoting load chute to raise unevenly and "rack" out of square.

To safely raise the pivoting load chute, the pivoting load chute must be in the fully retracted position, with any extendable section(s) nested within the first section (or base). One or more proximity sensors may be used to determine and confirm that the pivoting load chute is in the fully retracted position, with the outputs from those sensors communicated to a control logic. If there is confirmation that the pivoting load chute is in the fully retracted position, the control logic communicates instructions to illuminate a visual indicator (such as a green light) to notify and confirm to the operator that the pivoting load chute is in the fully retracted position. The operator then presses a "Raise Chute" push-button switch to initiate the automatic raise function, which is communicated to the control logic, which, in turn, sends an appropriate control signal to the hydraulic power unit to actuate the hydraulic cylinder(s) and extend the rod(s). To lower the pivoting load chute, the operator would then push and hold a "Lower Chute" push-button switch, which is communicated to the control logic, which, in turn, sends an appropriate control signal to the hydraulic power unit to initiate retraction of the rod(s).

DESCRIPTION OF THE INVENTION

The present invention is a pivoting load chute used to convey parcels.

Figure 1:
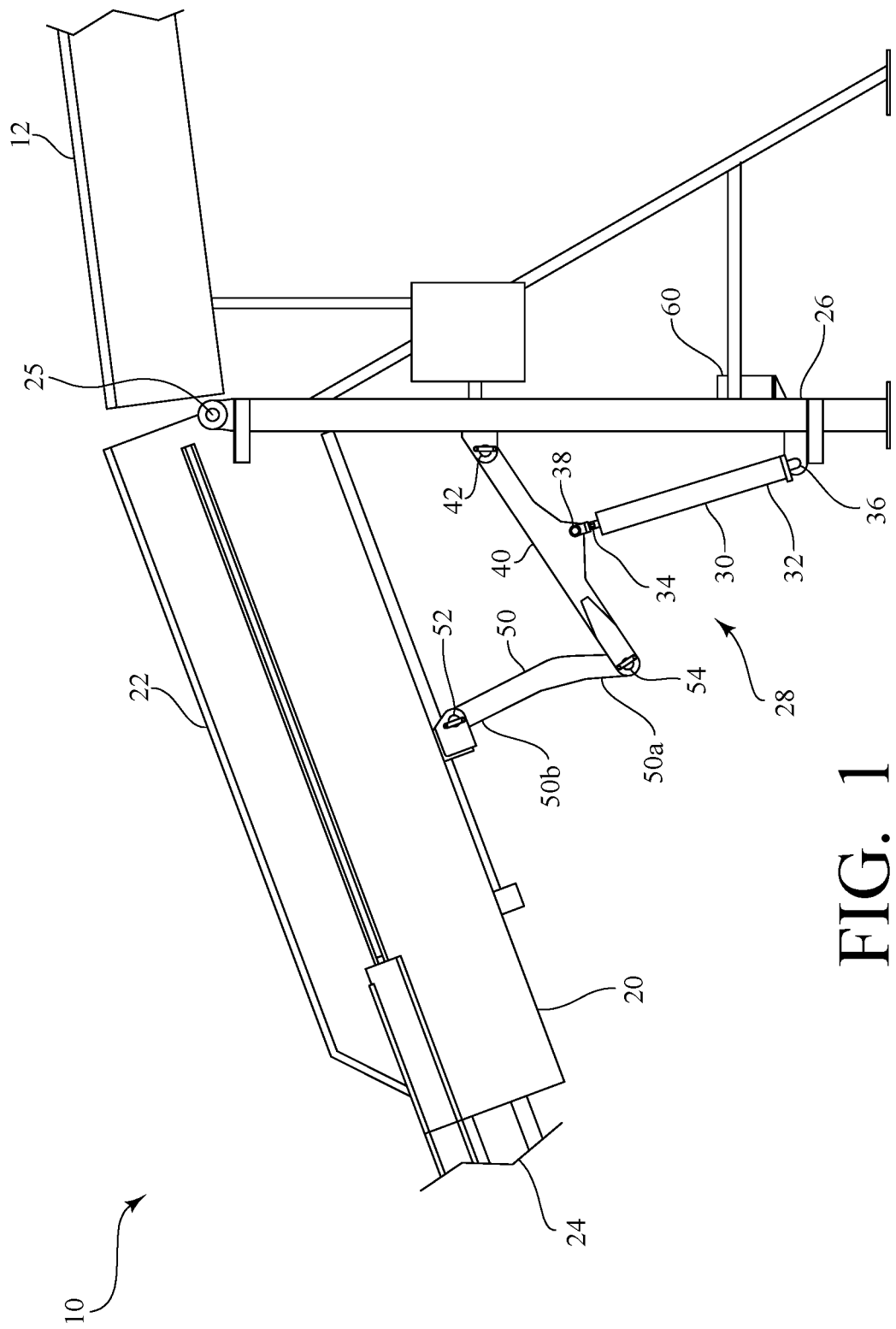
FIG. 1 is a side view of a conveying system, including an exemplary pivoting load chute made in accordance with the present invention in a lowered position.
Figure 2:
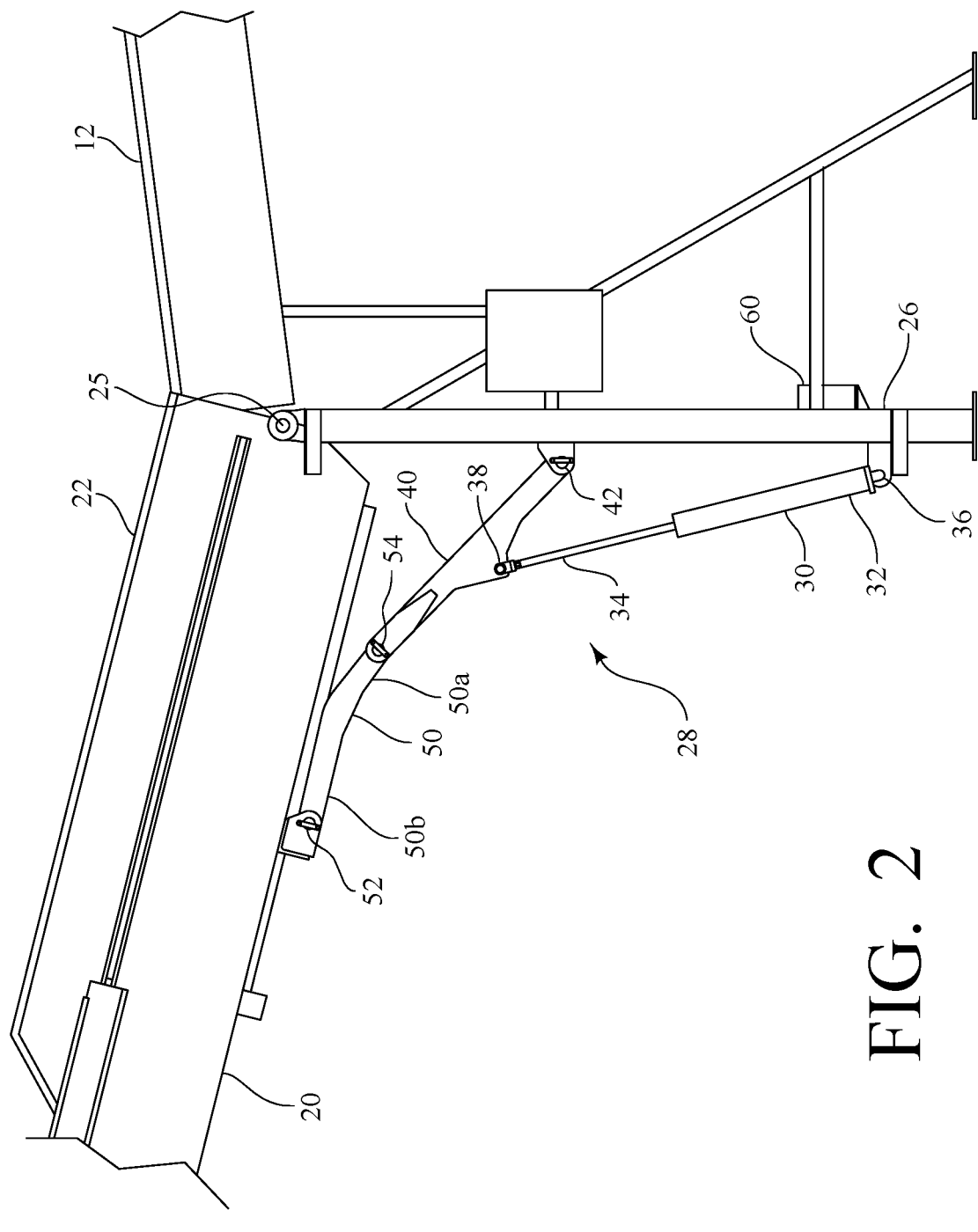
FIG. 2 is a side view similar to FIG. 1, but with the exemplary pivoting load chute in a raised position.

Referring first to FIGS. 1-2, a conveying system 10 includes an exemplary pivoting load chute 20 made in accordance with the present invention. As shown, in this conveying system, a secondary chute 12 is aligned with and configured to convey parcels (not shown) to the pivoting load chute 20.

As shown in FIG. 1, in this exemplary embodiment, the pivoting load chute 20 is extendable, with a first section (or base) 22 of a fixed length and a second section (or boom) 24 that moves longitudinally with respect to the first section in a telescoping relationship. In some embodiments, there could even be more than two sections. In any event, the multiple sections collectively define a conveying surface that extends from a first (or proximal) end to a second (or distal) end of the pivoting load chute 20. The construction of such an extendable, telescoping load chute is well-known in the art.

Referring again to FIGS. 1-2, the pivoting load chute 20 rotates about a substantially horizontal axis defined by a pin connection 25 between the first section 22 of the pivoting load chute and a support stand 26. Furthermore, the pivoting load chute 20 includes at least one linkage assembly 28 comprised of: a hydraulic cylinder 30 with a barrel 32 and a rod 34 (or similar mechanical or electromechanical actuator); a first linkage arm 40; and a second linkage arm 50. The second linkage arm 50 has a "dogleg" shape characterized by a lower section 50a separated from an upper section 50b by a bend, the importance of which will be described below.

Referring still to FIGS. 1-2, the barrel 32 of the hydraulic cylinder 30 is connected to a lower portion of the support stand 26 by a pin connection 36, such that the hydraulic cylinder 30 can rotate about a substantially horizontal axis defined by the pin connection 36. A first (or proximal) end of the first linkage arm 40 is connected to an intermediate portion of the support stand 26 by a pin connection 42, such that the first linkage arm 40 can rotate about a substantially horizontal axis defined by the pin connection 42. A distal end of the rod 34 of the hydraulic cylinder 30 is then connected to an intermediate portion of the first linkage arm 40 by a pin connection 38.

Referring still to FIGS. 1-2, a first (or proximal) end of the second linkage arm 50 is connected to a bottom portion of the first section 22 of the pivoting load chute 20 by a pin connection 52, such that the second linkage arm 50 can rotate about a substantially horizontal axis defined by the pin connection 52. A second (or distal) end of the second linkage arm 50 is then connected to a second (or distal) end of the first linkage arm 40 by a pin connection 54.

Figure 7:
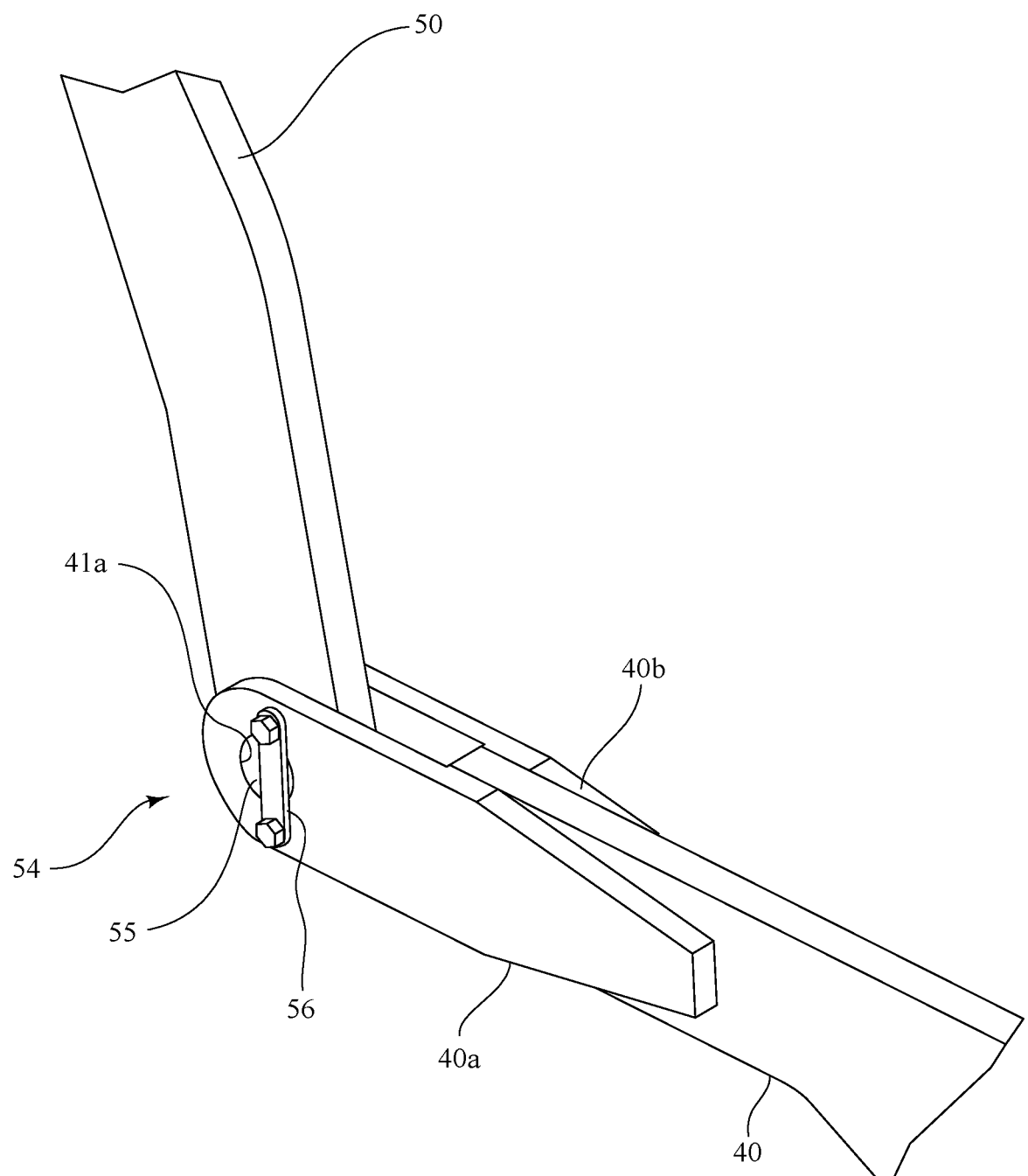
FIG. 7 is a partial enlarged and isolated view of the linkage assembly of the pivoting load chute in the conveying system of FIGS. 1 and 2.
Figure 7A:
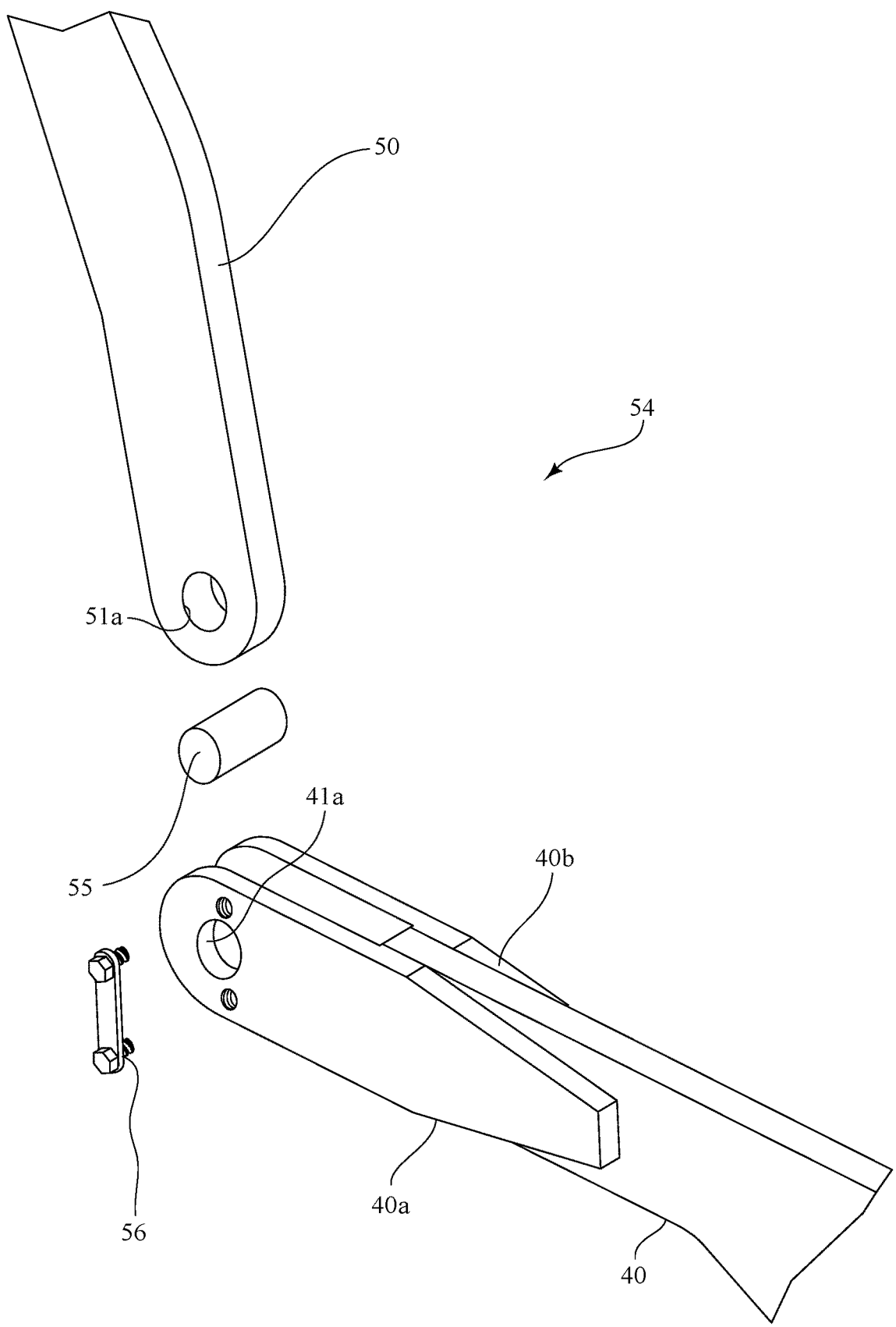
FIG. 7A is a partial exploded view of the linkage assembly of FIG. 7.

FIGS. 7 and 7A further illustrate the pin connection 54 in this exemplary embodiment. As shown, the second (or distal) end of the first linkage arm 40 terminates in a clevis-like structure of two parallel plates 40a, 40b. A hole 41a (one of which is visible in FIGS. 7 and 7A) is defined through each of these plates 40a, 40b. A hole 51a is also defined through the second (or distal) end of the second linkage arm 50. Thus, the second (or distal) end of the second linkage arm 50 is received between the two parallel plates 40a, 40b of the first linkage arm 40, and the respective holes 41a, 51a are in registry with on another such that a pin 55 can be inserted into the respective holes 41a, 51a to complete the pin connection 54. Furthermore, in this exemplary embodiment, a pivot pin capture plate 56 is secured to one or both of the two parallel plates 40a, 40b of the first linkage arm 40 to maintain the position of and/or prevent rotation of the pin 55.

Although not illustrated in detail, the pin connections 42, 52 are constructed in a similar manner to the pin connection 54 in this exemplary embodiment.

Referring again to FIGS. 1-2, to transition the pivoting load chute 20 from the lowered position (FIG. 1) to the raised position (FIG. 2), the rod 34 (or rods) of the hydraulic cylinder 30 (or cylinders) is extended. Such extension of the rod 34 applies a force to the first linkage arm 40 and causes it to rotate about the substantially horizontal axis defined by the pin connection 42 (clockwise). At the same time, the second linkage arm 50 begins to rotate relative to the first linkage arm about the substantially horizontal axis defined by the pin connection 54 (counterclockwise), and the second linkage arm 50 applies a force to the bottom portion of the first section 22 of the pivoting load chute 20. This causes the pivoting load chute 20 to rise and move toward the raised position (FIG. 2), as it rotates about the substantially horizontal axis defined by the pin connection 25 (clockwise) between the first section 22 of the pivoting load chute 20 and the support stand 26.

Figure 3:
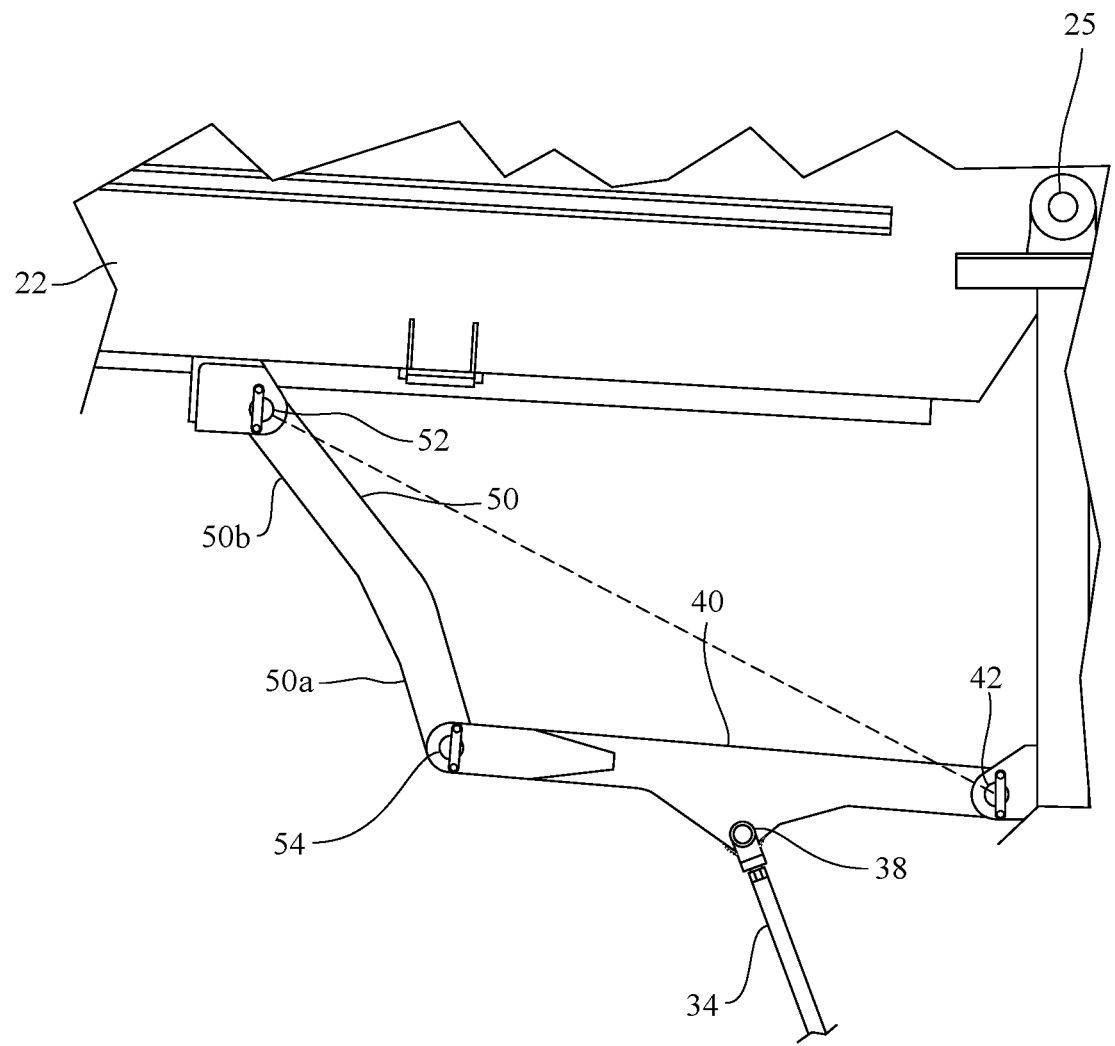
FIGS. 3-5 are partial enlarged side views of the exemplary pivoting load chute and its linkage assembly in the conveying system of FIGS. 1 and 2, as the pivoting load chute transitions between the lowered position and the raised position.

FIG. 3 is a partial enlarged side view of the pivoting load chute 20 and illustrates an intermediate position between the lowered position (FIG. 1) and the raised position (FIG. 2) in which the first linkage arm 40 and the second linkage arm 50 are in an "under center" position.

Figure 4:
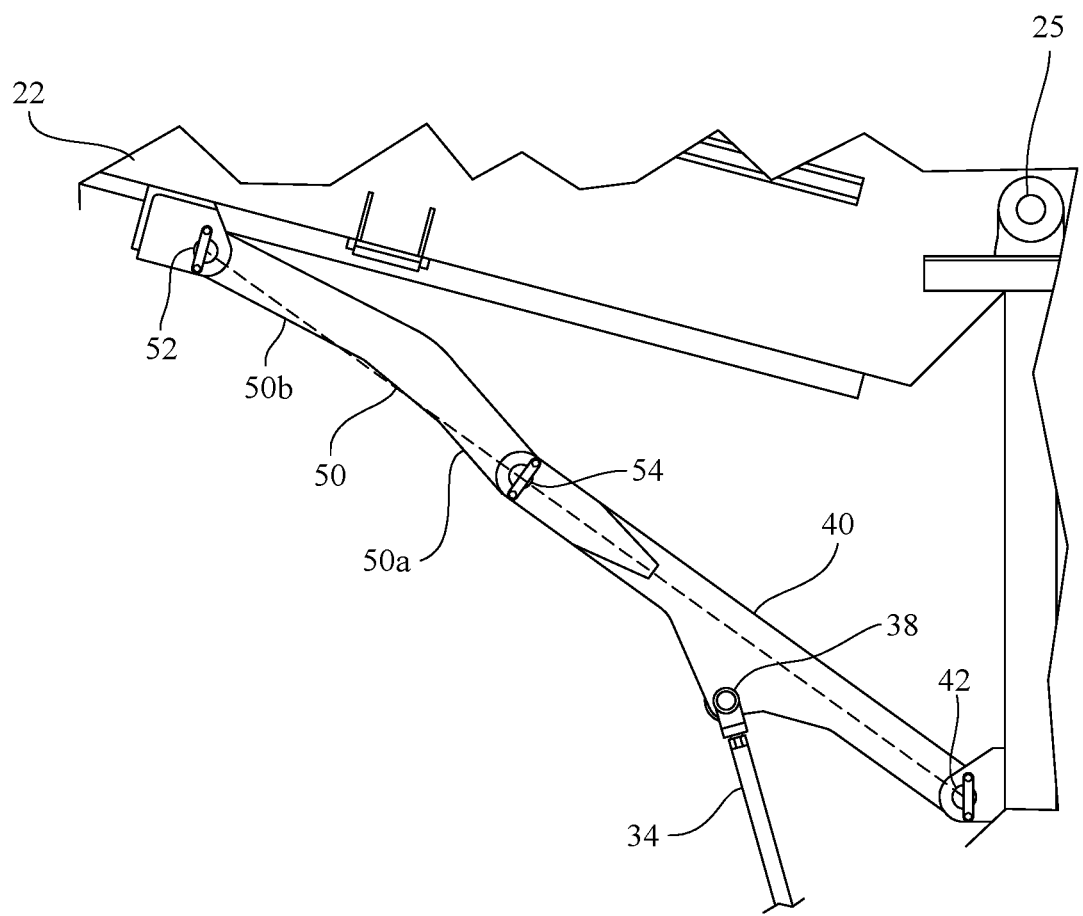

FIG. 4 is a partial enlarged side view of the pivoting load chute 20 and illustrates an intermediate position between the lowered position (FIG. 1) and the raised position (FIG. 2) in which the first linkage arm 40 and the second linkage arm 50 are in an aligned or "center" position.

Figure 5:
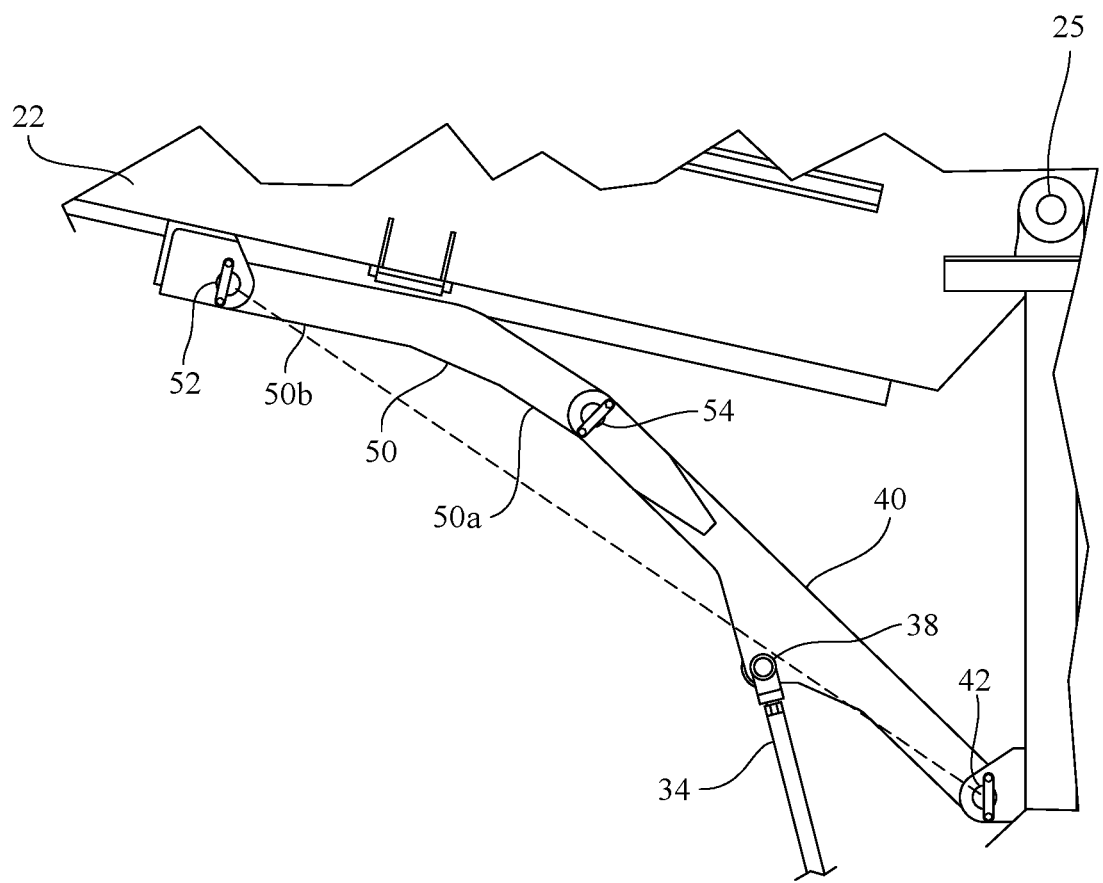

FIG. 5 is a partial enlarged side view similar to FIGS. 3-4 in which the pivoting load chute 20 has been transitioned to the raised position. As shown in FIG. 5, the linkage assembly 28 has moved "over center," and the linkage assembly 28 is now effectively locked into position. As shown, the upper section 50b of the second linkage arm 50 is oriented in a substantially parallel relationship with and provides an engagement surface contacting the bottom portion of the first section 22 of the pivoting load chute 20. In this regard, the "dogleg" shape of the second linkage arm 50 reduces the distance that the second linkage arm 50 travels after passing "over center." If the second linkage arm 50 was substantially straight, the pivoting load chute 20 would abruptly drop after passing "over center." Furthermore, in the raised position, it is contemplated and preferred that the full weight of the first and second sections 22, 24 of the pivoting load chute 20 is borne by the linkage assembly 28 (or assemblies), and the weight is no longer supported by the hydraulic cylinder 30 (or cylinders).

In order to return the pivoting load chute 20 from the raised position to a lowered position, the rod 34 (or rods) of the hydraulic cylinder 30 (or cylinders) is retracted. Such retraction of the rod 34 applies a force to the first linkage arm 40 that moves the linkage assembly 28 from the raised position in FIG. 5 and through the aligned or "center" position in FIG. 4 as the pivoting load chute 20 rotates about the substantially horizontal axis defined by the pin connection 25 (counterclockwise) between the first section 22 of the pivoting load chute 20 and the support stand 26.

Referring again to FIG. 3, after it passes through the aligned "or "center" position in FIG. 4, the weight of the first and second sections 22, 24 of the pivoting load chute 20 will cause it to continue to rotate about the substantially horizontal axis defined by the pin connection 25, with the hydraulic cylinder 30 (or cylinders) effectively serving as a damper to control such rotation.

Figure 6:
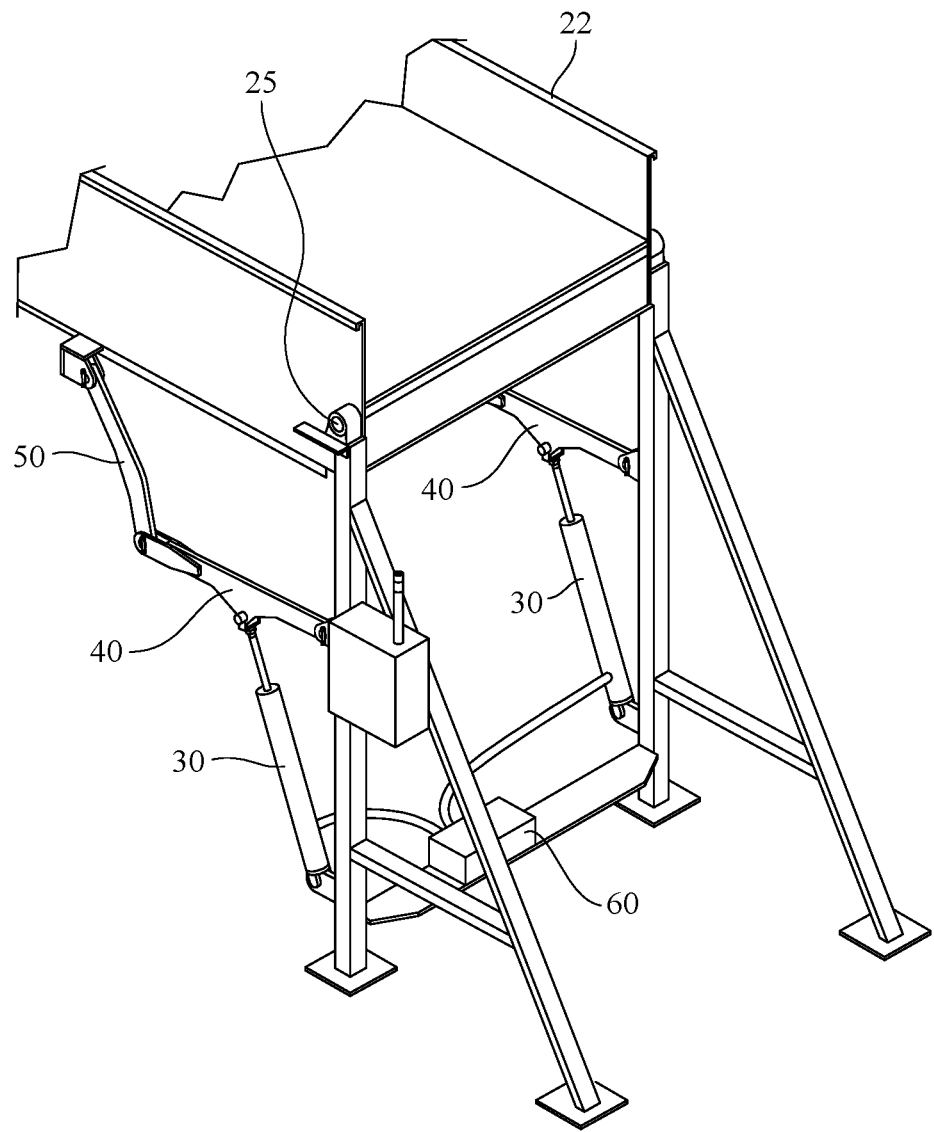
FIG. 6 is a partial perspective view of the pivoting load chute in the conveying system of FIGS. 1 and 2.

Referring now to FIG. 6, in this exemplary embodiment, the pivoting load chute 20 actually includes identical left and right linkage assemblies 28, one on each side of the support stand 26. However, a single hydraulic power unit 60 is preferably used to operate both hydraulic cylinders 30. Specifically, in this exemplary embodiment, the hydraulic power unit 60 is a 1-HP, 1-GPM, 120-V unit with self-contained reservoir and valve block. A flow divider/combiner is interposed between the hydraulic power unit 60 and the hydraulic cylinders 30 to ensure the hydraulic cylinders 30 are extended and retracted evenly. Without even flow and synchronized extension (or retraction) of the hydraulic cylinders 30, very slight manufacturing tolerances and/or slightly un-level conditions could cause the pivoting load chute 20 to raise unevenly and "rack" out of square.

Additionally, in this exemplary embodiment, each of the two hydraulic cylinders 30 is a 20"×2.5" cylinder with two-position, two-way, 120-V solenoid valves for delivering the hydraulic fluid to the cylinders 30. The hydraulic cylinders 30 are preferably sized such that, if one hydraulic cylinder 30 fails, the weight of the first and second sections 22, 24 of the pivoting load chute 20 will not immediately overwhelm the remaining functional hydraulic cylinder 30.

As a further refinement, an off-delay relay is preferably used when the pump is shut-off to hold the two-way solenoid valves in the raised position, until the hydraulic pump and motor have come to a complete stop. Without this feature, each solenoid valve would immediately "relax" into the lower position, causing the pivoting load chute 20 to drop momentarily.

Figure 8:
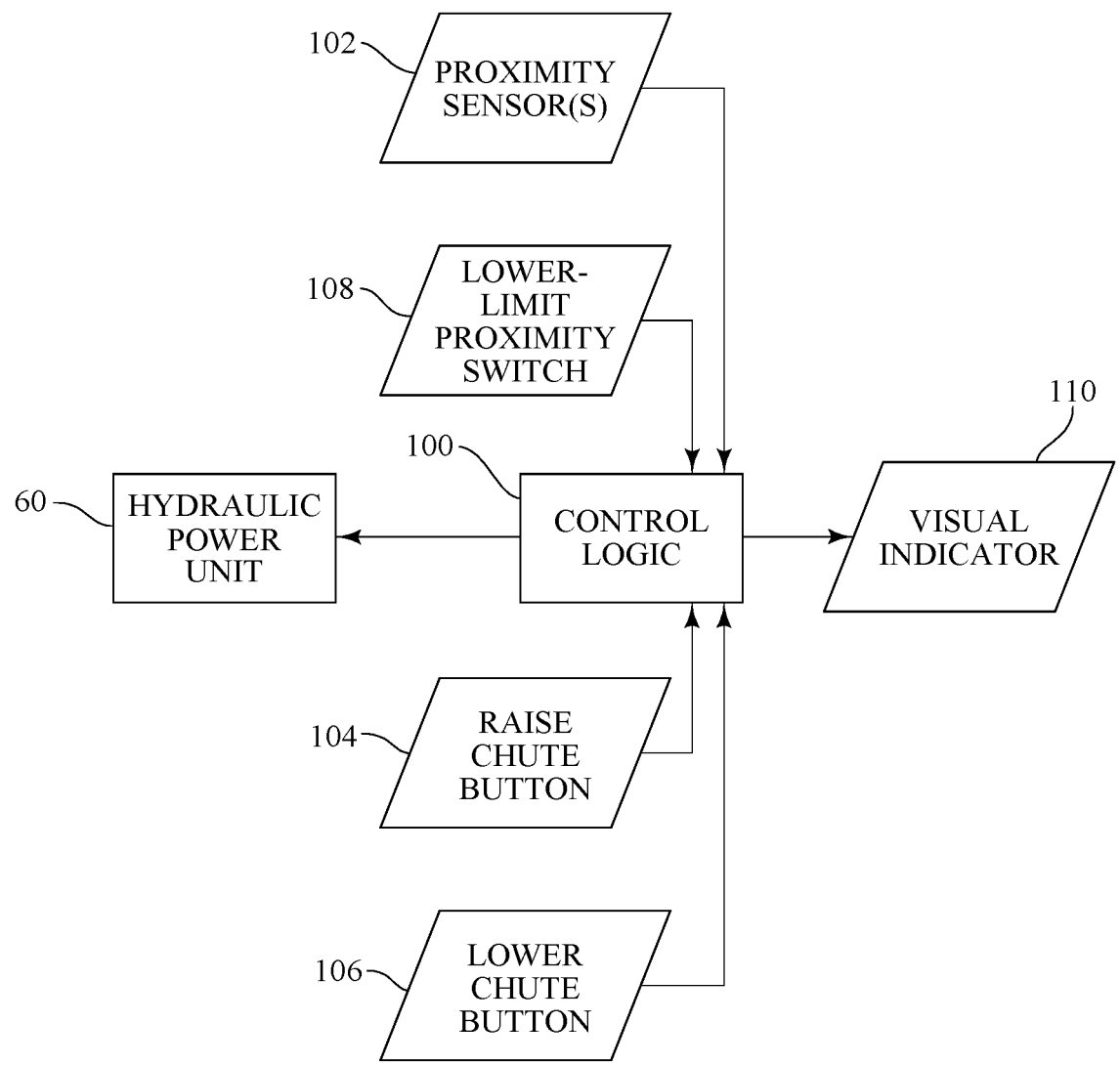
FIG. 8 is a schematic view of an exemplary control subsystem for operating a pivoting load chute made in accordance with the present invention.

Referring now to FIG. 8, to safely raise the pivoting load chute 20, the pivoting load chute 20 must be in the fully retracted position, with any extendable section(s) nested within the first section (or base). One or more proximity sensors 102 may be used to determine and confirm that the pivoting load chute 20 is in the fully retracted position, with the outputs from those sensors 102 communicated to a control logic 100. If there is confirmation that the pivoting load chute 20 is in the fully retracted position, in this exemplary implementation, the control logic 100 communicates instructions to illuminate a visual indicator 110 (such as a green light) to notify and confirm to the operator that the pivoting load chute 20 is in the fully retracted position. The operator then presses a "Raise Chute" push-button switch 104 to initiate the automatic raise function, which is communicated to the control logic 100, which, in turn, sends an appropriate control signal to the hydraulic power unit 60 to actuate the hydraulic cylinder(s) 30 and extend the rod(s) 34. To lower the pivoting load chute 20, the operator would then push and hold a "Lower Chute" push-button switch 106, which is communicated to the control logic 100, which, in turn, sends an appropriate control signal to the hydraulic power unit 60 to initiate retraction of the rod(s) 34.

As a further refinement, to prevent the operator from walking, reaching, or moving into the path of the pivoting load chute 20 while it is transitioning from the lowered position to the raised position, or vice versa, the switches 104, 106 for actuating the hydraulic cylinders 30 are preferably momentary push-button switches. Thus, the operator must press and hold each switch 104, 106 for the duration of the transition from the raised position to the lowered position, or vice versa.

As yet a further refinement, it is preferred that the operator must hold the "Lower Chute" push-button switch 106 until a lower-limit proximity switch 108 confirms that the pivoting load chute 20 has been lowered to a predetermined distance as measured from the underlying ground surface (e.g., thirty inches). If the "Lower Chute" push-button switch 106 is released prior to reaching this position, the control logic 100 will send an appropriate control signal to the hydraulic power unit 60 so that the pivoting load chute 20 will automatically return to the raised and locked position. After the pivoting load chute 20 has been lowered to a predetermined distance as confirmed by the lower-limit proximity switch 108, it will remain in that position, but then may be lowered further to a second predetermined distance as measured from the underlying ground surface (e.g., eighteen inches) by depressing and holding the "Lower Chute" push-button switch 106 again.

One of ordinary skill in the art will recognize that additional embodiments and implementations are also possible without departing from the teachings of the present invention. This detailed description, and particularly the specific details of the exemplary embodiments and implementations disclosed therein, is given primarily for clarity of understanding, and no unnecessary limitations are to be understood therefrom, for modifications will become obvious to those skilled in the art upon reading this disclosure and may be made without departing from the spirit or scope of the invention.

What is claimed is:
1. A pivoting load chute, comprising:
a support stand;
one or more sections that define a conveying surface, with the one or more sections configured for rotation relative to the support stand about a substantially horizontal axis between a lowered position and a raised position;
at least one linkage assembly, including
a first linkage arm,
a second linkage arm, and
a hydraulic cylinder with a barrel and a rod,
wherein the barrel of the hydraulic cylinder is pivotally connected to a lower portion of the support stand,
wherein a first end of the first linkage arm is pivotally connected to an intermediate portion of the support stand, wherein a distal end of the rod of the hydraulic cylinder is pivotally connected to an intermediate portion of the first linkage arm, wherein a first end of the second linkage arm is pivotally connected to a bottom portion of the one or more sections that define the conveying surface, and wherein a second end of the second linkage arm is pivotally connected to a second end of the first linkage arm;

wherein the one or more sections that define the conveying surface are transitioned from the lowered position to the raised position through extension of the rod of the hydraulic cylinder, which results in application of a force to the bottom portion of the one or more sections that define the conveying surface through the first linkage arm and the second linkage arm; and wherein, as the one or more sections that define the conveying surface transition from the lowered position to the raised position, the at least one linkage assembly moves over center and is locked into position, such that a full weight of the one or more sections that define the conveying surface is borne by the first linkage arm and the second linkage arm and is no longer supported by the hydraulic cylinder.

2. The pivoting load chute as recited in claim 1, wherein the one or more sections that define the conveying surface includes a first section of a fixed length and a second section that moves longitudinally with respect to the first section in a telescoping relationship.

3. The pivoting load chute as recited in claim 1, wherein the at least one linkage assembly includes a left linkage assembly and a right linkage assembly, one on each side of the support stand.

4. A pivoting load chute, comprising:
a support stand;
one or more sections that define a conveying surface, with the one or more sections configured for rotation relative to the support stand about a substantially horizontal axis between a lowered position and a raised position;
at least one linkage assembly, including
a first linkage arm,
a second linkage arm, and
a hydraulic cylinder with a barrel and a rod,
wherein the barrel of the hydraulic cylinder is pivotally connected to a lower portion of the support stand,
wherein a first end of the first linkage arm is pivotally connected to an intermediate portion of the support stand,
wherein a distal end of the rod of the hydraulic cylinder is pivotally connected to an intermediate portion of the first linkage arm,
wherein a first end of the second linkage arm is pivotally connected to a bottom portion of the one or more sections that define the conveying surface, and
wherein a second end of the second linkage arm is pivotally connected to a second end of the first linkage arm;
wherein the one or more sections that define the conveying surface are transitioned from the lowered position to the raised position through extension of the rod of the hydraulic cylinder, which results in application of a force to the bottom portion of the one or more sections that define the conveying surface through the first linkage arm and the second linkage arm;
wherein, as the one or more sections that define the conveying surface transition from the lowered position to the raised position, the at least one linkage assembly moves over center and is locked into position; and
wherein the second linkage arm has a dogleg shape characterized by a lower section separated from an upper section by a bend, and wherein, in the raised position, the upper section of the second linkage arm is oriented in a substantially parallel relationship with and provides an engagement surface contacting the bottom portion of the one or more sections that define the conveying surface.

5. The pivoting load chute as recited in claim 4, wherein the one or more sections that define the conveying surface includes a first section of a fixed length and a second section that moves longitudinally with respect to the first section in a telescoping relationship.

6. The pivoting load chute as recited in claim 4, wherein the at least one linkage assembly includes a left linkage assembly and a right linkage assembly, one on each side of the support stand.

7. A pivoting load chute, comprising:
a support stand;
one or more sections that define a conveying surface, with the one or more sections configured for rotation relative to the support stand about a substantially horizontal axis between a lowered position and a raised position; and
at least one linkage assembly, including
a first linkage arm, with a first end of the first linkage arm operably connected to the support stand,
an actuator that is operably connected to and extends between the support stand and the first linkage arm, and
a second linkage arm, with a first end of the second linkage arm operably connected to the one or more sections that define the conveying surface, and with a second end of the second linkage arm operably connected to a second end of the first linkage arm;
wherein the one or more sections that define the conveying surface are transitioned from the lowered position to the raised position through actuation of the actuator, which results in application of a force to a bottom portion of the one or more sections that define the conveying surface through the first linkage arm and the second linkage arm; and
wherein, as the one or more sections that define the conveying surface transition from the lowered position to the raised position, the at least one linkage assembly moves over center and is locked into position, such that a full weight of the one or more sections that define the conveying surface is borne by the first linkage arm and the second linkage arm and is no longer supported by the actuator.

8. The pivoting load chute as recited in claim 7, wherein the actuator is a hydraulic cylinder with a barrel and a rod, with extension of the rod of the hydraulic cylinder resulting in the application of the force to the bottom portion of the one or more sections that define the conveying surface through the first linkage arm and the second linkage arm.

9. The pivoting load chute as recited in claim 7, wherein the one or more sections that define the conveying surface includes a first section of a fixed length and a second section that moves longitudinally with respect to the first section in a telescoping relationship.

10. The pivoting load chute as recited in claim 7, wherein the at least one linkage assembly includes a left linkage assembly and a right linkage assembly, one on each side of the support stand.

11. A pivoting load chute, comprising:
a support stand;
one or more sections that define a conveying surface, with the one or more sections configured for rotation relative to the support stand about a substantially horizontal axis between a lowered position and a raised position; and
at least one linkage assembly, including
  a first linkage arm, with a first end of the first linkage arm operably connected to the support stand,
  an actuator that is operably connected to and extends between the support stand and the first linkage arm, and
  a second linkage arm, with a first end of the second linkage arm operably connected to the one or more sections that define the conveying surface, and with a second end of the second linkage arm operably connected to a second end of the first linkage arm;
wherein the one or more sections that define the conveying surface are transitioned from the lowered position to the raised position through actuation of the actuator, which results in application of a force to a bottom portion of the one or more sections that define the conveying surface through the first linkage arm and the second linkage arm; and
wherein the second linkage arm has a dogleg shape characterized by a lower section separated from an upper section by a bend, and wherein, in the raised position, the upper section of the second linkage arm is oriented in a substantially parallel relationship with and provides an engagement surface contacting the bottom portion of the one or more sections that define the conveying surface.

12. The pivoting load chute as recited in claim 11, wherein, as the one or more sections that define the conveying surface transition from the lowered position to the raised position, the at least one linkage assembly moves over center and is locked into position.

13. The pivoting load chute as recited in claim 12, wherein the actuator is a hydraulic cylinder with a barrel and a rod, with extension of the rod of the hydraulic cylinder resulting in the application of the force to the bottom portion of the one or more sections that define the conveying surface through the first linkage arm and the second linkage arm.

14. The pivoting load chute as recited in claim 11, wherein the actuator is a hydraulic cylinder with a barrel and a rod, with extension of the rod of the hydraulic cylinder resulting in the application of the force to the bottom portion of the one or more sections that define the conveying surface through the first linkage arm and the second linkage arm.

15. The pivoting load chute as recited in claim 11, wherein the one or more sections that define the conveying surface includes a first section of a fixed length and a second section that moves longitudinally with respect to the first section in a telescoping relationship.

16. The pivoting load chute as recited in claim 11, wherein the at least one linkage assembly includes a left linkage assembly and a right linkage assembly, one on each side of the support stand.

* * * * *